United States Patent [19]

Imoto

[11] Patent Number: 5,780,519
[45] Date of Patent: Jul. 14, 1998

[54] LIGHT WEIGHT LIGNOCELLULOSIC MOLDING PRODUCTS

[76] Inventor: Saburo Imoto, 2-6-8, Nakayamadai, Takarazuka-shi, Hyogo, Japan

[21] Appl. No.: 828,332

[22] Filed: Mar. 28, 1997

[51] Int. Cl.$^6$ ..................................................... C08J 9/28
[52] U.S. Cl. ..................... 521/68; 521/65; 521/70; 521/84.1; 524/13; 524/14; 524/28; 524/35; 524/45; 527/103
[58] Field of Search ................. 524/13, 14, 28, 524/35, 45; 527/103; 521/68, 65; 621/70, 84.1

[56] References Cited

U.S. PATENT DOCUMENTS

| | | | |
|---|---|---|---|
| 4,045,595 | 8/1977 | Chiu et al. | 427/202 |
| 4,808,454 | 2/1989 | Saitoh | 428/42 |
| 5,096,945 | 3/1992 | Sun | 524/13 |
| 5,098,472 | 3/1992 | Watkins et al. | 106/15.05 |
| 5,130,352 | 7/1992 | Chow | 524/13 |
| 5,153,243 | 10/1992 | Kimura et al. | 524/13 |
| 5,214,081 | 5/1993 | Lepori et al. | 524/35 |
| 5,306,739 | 4/1994 | Lucey | 524/413 |
| 5,502,088 | 3/1996 | Hododi | 524/13 |
| 5,658,511 | 8/1997 | Nicolay | 264/112 |

FOREIGN PATENT DOCUMENTS

| | | | |
|---|---|---|---|
| 18897 | 7/1975 | Japan | 524/13 |
| 1215677 | 9/1986 | Japan | 527/103 |
| 1236858 | 10/1986 | Japan | 524/13 |

*Primary Examiner*—Judy M. Reddick
*Attorney, Agent, or Firm*—Koda & Androlia

[57] ABSTRACT

Lignocellulosic light weight molding products which are useful as heat insulator, shock absorber, sound absorber and so on and have open-celled foam-structure are mainly composed of lignocellulose that is able to use in not only fibrous shape but also other various shapes. They are at least composed of four components shown hereunder; (1) lignocellulose, (2) water soluble high polymer containing not less than two OH groups in a molecule and having the film properties of tensile strength 10 to 300 MPa and surface tension 30 to 65 mN/m in 0.4 wt % aqueous solution at 20° C., (3) water soluble high polymer containing not less than two carboxyl groups in a molecule and/or anionic surfactant, and (4) high polymer having the film properties of tensile strength 0.1 to 10 MPa and ultimate elongation 200 to 2000%, 2nd transition point 30° to 40° C. and cohesion energy density 30 to 200 cal/cc.

2 Claims, No Drawings

LIGHT WEIGHT LIGNOCELLULOSIC MOLDING PRODUCTS

BACKGROUND OF THE INVENTION

This invention relates to light weight lignocellulosic molding products using as parts of heat insulators, shock absorbers, sound absorbers and so on.

The usual method for the production of light weight lignocellulosic molding normally involves only forming fiberboard like hardboard and medium density fiberboard (MDF) from fibrous lignocellulosic raw material, waste paper and linter by using intertwining property in large aspect ratio. In this invention, lignocellulose as raw material is able to use with not only fibrous shape but also other various shapes.

In the injection and extrusion moldings made from thermoplastic or thermosetting resin, wood powder and foaming agent, where the lignocellulosic content is 40 wt % and under because of difficulties of molding technique, and therefore these are within plastic moldings and out of lignocellulosic ones.

The previous methods extract useful cellulose from wood and scrap the rest, and then produce light weight moldings. Further, scrap wood in processing are only used as fuel and compost.

A further object of this invention is to provide the properties of additives and their additional ratios for the production of light weight moldings from non-intertwining cellulosic raw materials having powdered, granular, needle and scale shapes.

In the production of foam-moldings which contain lignocellulose 50 wt % and over, especially having homogeneous foam structure and good mechanical property, the wet process using solvent like water is superior to dry process. When the soluble or emulsified adhesives in water are used for the wet process, they migrate to the surface of moldings with water in drying and make a thin film on moldings, therefore drying speed slows down and the structure of finished moldings is remarkably heterogeneous. The presence of bubbles in molding compound particularly accelerates migration of adhesives to surface in drying, therefore the wet process cannot adopt without inhibiting a migration of adhesives. As lignocellulose absorbs much water over its own weight, there is a limit of reducing quantity of water used in molding and the inhibition of adhesive migration is important in wet process.

In order to obtain the homogeneous structure of foam-moldings, the slurry of lignocellulose bubbled by air must be dried up, keeping bubbles finely dispersed without growing together.

This invention finds a technical solution to the above and the method for production of the foam moudlings from the raw materials of finely crushed wood pieces, sawdust, planer shaving and unused waste lignocellulose. The products of this invention are used as the parts of heat insulator, shock absorber, sound absorber, absorbent, filter and compounds materials with others, and moreover they are available as fuel for scrapping after using, therefore this invention completes a recycle chain of resources and contributes to protecting and improving environment as the final object.

SUMMARY OF THE INVENTION

The lignocellulosic light weight molding products of this invention are at least composed of four components shown hereunder; (1) lignocellulose, (2) water soluble highpolymer containing not less than two OH groups in a molecule and having the film properties of tensile strength 10 to 300 MPa (mega-Pa) and surface tension 30 to 65 mN/m (milli-N/meter) in 0.4 wt % aqueous solution at 20° C., (3) water soluble high polymer containing not less than two carboxyl groups in a molecule and/or anionic surfactant, and (4) high polymer having the film properties of tensile strength 0.1 to 10 MPa and ultimate elongation 200 to 2000%, 2nd transition point 30° to 40° C. and cohesion energy density 30 to 200 cal/cc.

Furthermore describing in detail, the molding products of this invention have low density by containing air foam and composed of the following;

(1) 100 wt parts of lignocellulose as main component, (2) 0.5 to 10 wt parts of water soluble high polymer containing not less than two OH groups in a molecule and having the film properties of tensile strength over 10 MPa-suitable range 30 to 300 MPa and surface tension 30 to 65 mN/m in 0.4 wt % aqueous solution at 20° C., is added to lignocellulose.

(3) 1 to 20 wt parts of water soluble high polymer containing not less than two carboxyl groups and/or anionic surfactant, (4) 5 to 150 wt parts of high polymer having the film properties of tensile strength 0.1 to 10 MPa and ultimate elongation 200 to 2000%, 2nd transition point (Tg) −40° to 300° C. and cohesion energy density 30 to 200 cal/cc.

DETAILED DESCRIPTION OF THE INVENTION

In this invention, the foams of lignocellulose, which have open-celled structures are manufactured by extruding or casting molding compounds of four components described herein before. Over 50 wt % of lignocellulose contents and 0.25 (g/cm$^3$) or less of apparent density are preferable for the above foams.

The foams of lignocellulose content 50 wt % or less are produced so far by mixing lignocellulose with thermoplastic resin, such as polyethylene, polypropylene, polyurethane, polyvinyl chloride, polystyrene, and foaming agent like azobis-isobutyronitryl, and by extruding at the temperature over melting point of resin. This manufacture by dry method is already known well, and the obtained foams have the close-celled structure. But, in the case of cellulosic content of 50 wt % and over, the molding compounds lose fluidity are difficult or impossible to extrude, and therefore the foam structure of products is not uniform. But the molding compound of components described in this invention produces the foams that have apparent density under 0.6 g/cm$^3$ and the uniform and open-celled structure in even lignocellulose content 50 wt % and over not to mention under 50 wt % or less. Especially in the lignocellulose content 50 wt % and over it is the merit of this invention that light weight foam products having the uniform structure, the good mechanical properties and the apparent density 0.25 g/cm$^3$ or less are obtained. As aforesaid, because this invention method doesn't restrict the shape of lignocelluloses, powdered and granular lignocelluloses can coexist with fibrous ones. Also, it can coexist with various fibrous raw materials, e.g. natural fibers (wool, cotton or hemp), inorganic fibers (metal, glass, carbon or rock-wool), in the condition of lignocellulose content 50 wt % and over. In this case, the content of lignocellulose is desirable 90 wt % or less, as the fluidity of molding compound is bad and it is difficult to mold the compound 90 wt % and over of lignocellulose content.

0.5 to 20 wt % of chemical compound that has active groups not less than two in a molecule, reacting with OH or carboxyl groups, can use for above cellulosic molding compound.

The used high polymer must have low surface tension, good mechanical properties and the tendency to make a bilayer membrane packing bubbles so that the air bubbled in molding slurry of lignocellulose may disperse homogeneously and become stable. As the result of various investigations, it turns out that the water soluble high polymer used in this case must have 30 to 65 mN/m of surface tension in 0.4 wt % aqueous solution at 20° C. and not less than two OH groups having the nature orientating parallel and associating with each other, in a molecule; for example derivatives of polyvinyl alcohol (PVA) and cellulose, OH groups of which are partly etherified and acetalized with alcohol or aldehyde having alkyl groups of 1 to 8 of carbon number, respectively.

These water soluble high polymers are added in the required amount of minimum to lignocellulose, ordinarily from 0.5 wt % to less than 10 wt %, preferably from 2 to under 5 wt %. When the water soluble polymer is added excessively, it migrated with water and makes a film on surface of product during heat molding because of association property, good film-formation ability and high tensile strength, and consequently the uniform foam-structure is not obtained and the satisfactory molding is not carried out. Its optimum amount of addition must be less than 10 wt % to lignocellulose, being affected by apparent density of product and diamiter of lignocellulose particle.

The slurry occluding bubbles get worse in fluidity. As lignocellulose itself absorbs specially water, the fluidity of slurry is improved by addition of much water. But, the presence of a great deal of water causes the migration of high polymer to the surface of product for molding and the remarkable prolongation of drying hour. The addition of water soluble high polymer having two and over of carboxyl groups in a molecule or anionic surfactant is effective in order to improve the fluidity of slurry, and also it is recognized that they contribute to not only the improvement of slurry fluidity with addition of a little water, but also the inhabitation of migration of high polymer for molding. On these facts, the use of them makes it possible to increase evaporating speed of water for molding. There is, however, the optimum amount of their addition, and the use of both or either of high polymer containing carboxyl groups and anionic surfactant, respectively, is 1 to 20 wt % to lignocellulose, preferably 2 to 10 wt % and does not exceed 20 wt %. The more addition than optimum amount causes reversely the heterogeneous foam-structure and reducing fluidity of slurry.

The water soluble high polymers containing two and over carboxyl groups in a molecule are polyacrylic acid and its derivatives, polymethaacrylic acid and its derivatives, copolymer of maleic acid, carboxylmethyl cellulose (CMC), sodium alginate and so on. Anionic surfactants are sodium salt of fatty acid, fatty alcohol sulfate, alkyl benzen sulfonate.

Keeping bubbles stable as mentioned above, it is required to distribute effectively and uniformly adhesives binding lignocellulose each other and to make the products mechanically strong. As the smaller amount of water in slurry is favorable for molding, emulsion is used as adhesive. But, the emulsion of adhesive is easy to migrate with water, therefore the addition of water soluble high polymer containing two and over carboxyl groups or/and anionic surfactant is very effective.

It becomes clear that high polymer as adhesive has Tg −40° to 30° C., preferably −20° to 10° C., tensile strength 0.1 to 10 MPa, preferably 0.5 to 6 MPa, ultimate elongation 200 to 2000%, preferably 300 to 1800% and also cohesion energy density 30 to 200 cal/cc, preferably 60 to 120 cal/cc, for having affinity with lignocellulose and binding those each other. The satisfactory high polymers are styrene-butadiene copolymer (SBR) containing over 35 wt % of butadiene, methyl methacrylate-butadiene copolymer, ethylene-vinyl acetate copolymer (EVAC) of ethylene content 5 to 50 wt %, vinyl acetate-acrylic ester copolymer of vinyl acetate content under 80 wt %, vinyl acetate-other vinyl ester copolymer, vinyl acetate-vinyl ether copolymer and so on. These high polymers as adhesives are added 5 to 150 wt %, preferably 10 to 120 wt %, to lignocellulose. They in this range give to the foam-structure the stable uniformity and the elasticity restored easily by release of outside force.

After adding at least each of four components above, mixing well and preparing an aqueous slurry, air is bubbled dispersedly in slurry. The size and dispersion state of bubbles change, of course, with water content and viscosity of slurry and are effected by stirring speed in even the same slurry, therefore under these same conditions products having the fixed foam-structure are obtained by effect of each component. The slurry containing bubbles evaporates water in a dryer and is molded, and at that time if the drying of slurry is carried out on Teflon sheet or belt whose surface is processed with Teflon, the products are released easily from a mold.

When the slurry containing bubbles is continuously extruded and dried on the endless sheet, the sheets which have foams with the open-celled structure are continuously obtained. Also, when the slurry is molded on the sheet or belt made from materials which wet well with the slurry, for example, paper, fabrics, mortar, glassfiber-mat, wooden board, plastic plate or sheet, metal plate like aluminum and steel, and metal foil, the integrate molding products which are laminated with lignocellulose foam are obtained.

The lignocellulose foams produced by this invention have apparent density 0.6 (g/cm$^3$) or less, and it is especially characteristic of this invention that foams having 0.25 to 0.1 (g/cm$^3$) of density in thickness under 5 cm are easily obtained. In thickness under 1 cm, the foam of density under 0.1 (g/cm$^3$) are obtained precisely. The product has mostly open-celled structure and absorbs 2 to 8 times water as heavy as weight of itself having 0.3 to 0.1 (g/cm$^3$) of apparent density.

The lignocellulose foams made from four of main components have the fully water resistance at room temperature, and the organic and/or inorganic compounds which have functional groups of two and over in a molecule, reacting with OH and carboxyl groups, are added to slurry as another component and molded in order to increase water resistance at high temperature. The above organic compounds are glyoxal, trimethylol melamine, tris(2-hydroxyethyl)-isocyanurate and so on, and the above inorganic compounds are calcium oxide, aluminum oxide, ferric oxide, clay like kaolinite and so on. They increase water resistance and hardness of molding product without change of foam-structure. The amount of their addition is 0.1 to 40 wt %, with requirement of water resistance and hardness of product, and in the case of added amount of 40 wt % and over the fluidity of slurry decreases and the stable foam-structure of product is not obtained.

The lignocellulosic foams whose surface is processed by fluoride polymer such as Teflon can be used as the waterproof moisture absorbent and release material, and, if necessary, various additives such as noninflammable agent, fragrant substance, mold inhibitor, sterilizer, caloring agent and so on are used within the limits of damage to foams properties.

High polymers, such as SBR and EVAC, that have the elasticity of tensile strength 0.1 to 10 MPa and ultimate elongation 200 to 2000%, rubbery property at room temperature (Tg −40° to 30° C.) and good adhesion to cellulose in cohesion energy density 30 to 200 cal/cc adhere to lignocellulose which is the skeleton of light weight foam product. In this case, the emulsion or latex of above high polymer works effectively for bubbling air in aqueous solution.

Additional amount 0.5 to 10 wt % of water soluble polymer, such as PVA, having OH groups to lignocellulose contributes to both stabilizing and increasing mechanical property of bubble for bubbling process. Therefore, tensile strength of its film needs at least not less than 10 MPa, and the less its surface tension in 0.4 wt % aqueous solution is 65 mN/m or less, the better the effect becomes. But the polymer that comes out in aqueous solution at temperature over 30° C. loses the effect on stabilization of bubbles.

It is water soluble polymer that plays a part in adhesion, stabilization of bubbles, controlling or improving fluidity of slurry, and preventing the migration of adhesives and stabilizer to bubbles. It has not less than two COOH groups in a molecule, such as polyacrylic acid and CMC. Anionic surfactant also plays the same part, and is useful for both improving fluidity and preventing migration, even in blending with polymer like polyacrylic acid.

The light weight molding products of lignocellulose in this invention contain four indispensable components, and also increase more water resistance with addition of glyoxal, trimethylol melamine and so on that cross-link by chemical bond with polymer containing OH and carboxyl groups. Clay such as kaolin and Bentonite is useful for burning hardly and silicone resin is very useful for giving a waterproof and a high degree of water resistance to surface of molding product.

The composition that consists of the above component supplies the light weight molding product having apparent density of 0.25 g/cm$^3$ or less and excellent properties even in the condition of lignocellulose content of 50 wt % and over.

The invention will illustrate by examples, but its contents are not restricted within only examples hereunder.

EXAMPLE 1

To 60 g of mixture, combined with 100 g of styrene-butadiene copolymer latex (SBR) (Solid concentration 48 wt %, styrene content in copolymer 48 wt %), 50 g of PVA-217E aqueous solution of 10 wt % concentration (PVA-217E by Kuraray Co., surface tension 51 mN/m in 0.4% aqueous solution) and 20 g of ISOBAM-104 (by Kuraray Co., isobutyrene-maleic anhydride copolymer) 10 wt % aqueous solution, 19.5 g of HINOKI (a Japanese cypress) powder passing through sieve mesh 0.05 mm as a lignocellulose material and 108 g of water are added. The slurry that is bubbled up by mixing strongly for ten minutes is dried on Teflon sheet in the drier of 80° C., and then foam-sheet of thickness 5 mm is obtained. The sheet has a uniform form-structure and apparent density 0.17 g/cm$^3$. When it is immersed in 30° C. of water for 24 hours, its shape dose not change at all.

EXAMPLE 2

To the mixture, combined with 52 g of methyl methacrylate-butadiene copolymer latex (by Sumitomo-Dow Co.,) of solid concentration 48 wt %, 5 g of PVA-420 (by Kuraray Co., surface tension 47 mN/m in 0.4 wt % aqueous solution)aqueous solution of 10 wt % concentration, 3 g of CMC aqueous solution of 10 wt % concentration and 100 g of water, 25 g of HINOKI powder passing through 0.5 mm of sieve mesh is added, and then it is bubbled by stirring with home mixer for ten minutes. The obtained slurry has 0.61 g/cm$^3$ of apparent density, and when water in it is evaporated, it should be expected to obtain product having apparent density 0.28 g/cm$^3$ in calculation. This slurry is dried actually on Teflon sheet in drying oven at temperature of 80° C., and foam-sheet of thickness 7 mm is obtained. Its apparent density is 0.278 g/cm$^3$ by actual survey and gives good agreement with the calculated value above. This fact shows that the foam-structure was made up keeping the very state of slurry. Then 3 g of obtained sheet is immersed in 30° C. of water for 24 hours, it has 11.5 g of absorbed water weight and 383% (based on sheet) rate of water absorption.

EXAMPLE 3

To the mixture, combined with 50 g of ethylene-vinyl acetate copolymer emulsion (by Kuraray Co., charge of particle: nonion, Tg=0° C., tensile strength of film 1.7 MPa, ultimate elongation 1500%) of solid concentration 56 wt %, 5 g of PVA-420 aqueous solution of 10 wt % concentration, 13 g of ISOBAM-104 aqueous solution of 10 wt % concentration and 90 g of water, 25 g of HINOKI powder used in Example 2 is added, and then the slurry obtained by the same operation as Example above is dried at 80° C. The foam-sheet that has 6.5 mm of thickness and 0.34 g/cm$^3$ of apparent density is obtained.

EXAMPLE 4

40 g of HINOKI powder passing through sieve mesh 0.5 mm and 20 g of HINOKI powder passing through sieve mesh 5.5 mm are added to mixture that is blended 16 g of SBR, 8 g of PVA-420 aqueous solution of 10 wt % concentration, 3 g of 10 wt % aqueous solution of ISOBAM-104 and 57 g of water and the slurry that is made by bubbling the above mixture with home mixer for 10 minutes is dried on Teflon sheet in drying oven of 80° C. and molded.

The obtained foam-sheet of thickness 4 mm has a uniform foam-structure, 0.21 g/cm$^3$ of apparent density and 87 wt % of lignocellulose content (based on sheet).

EXAMPLE 5

To 60 g of mixture, combined with 100 g of the same SBR that is used in Example 1, 50 g of 10 wt % PVA-217-E aqueous solution and 20 g of 10 wt % ISOBAM-104 aqueous solution, 19.5 g of HINOKI powder passing through sieve mesh 0.5 mm, 7.8 g of montmorillonite (Hohjun Bentonite) and 100 g of water are added. And then, the slurry made by bubbling the above mixture with home mixer for 10 minutes is dried on Teflon sheet in dryer of 80° C. and molded. The foam-sheet in thickness 5 mm as molded product has a uniform foam-structure and 0.28 g of apparent density. When it is immersed in 30° C. of water for 24 hours, its shape does not change at all.

EXAMPLE 6

To 60 g of mixture, combined with 100 g of the same SBR that is used in Example 1, 50 g of 10 wt % PVA-217-E aqueous solution and 20 g of 10 wt % ISOBAM-104 aqueous solution, 19.5 g of HINOKI powder passing through sieve mesh 0.5 mm, 3.1 g of trimethylolmelamine and 100 g of water are added.

And then, the slurry made by bubbling the above mixture with home mixer for 10 minutes is dried on Teflon sheet in dryer of 80° C. and molded. The mold foam-sheet of thickness 5 mm has a uniform foam-structure and 0.23 g of apparent density. When it is immersed in 30° C. of water for 24 hours, its shape dose not change at all.

COMPARISON 1

The same manufacture as one of Example 3 is carried out likewise except addition of 10 wt % ISOBAM-104 aqueous solution. In this case, ethylene-vinyl acetate copolymer migrates to surface and comes to make a thin film on the surface, and therefore drying for molding takes a longer time. The obtained sheet has a heterogeneous foam-structure. It is recognized by the above that water soluble polymer having not less than two carboxyl groups in a molecule contributes to inhibiting migration of polymer.

COMPARISON 2

To mixture, combined with 52 g of methyl acrylate-vinyl acetate copolymer emulsion (charge of particle: nonion, Tg=0° C.), 40 g of 10 wt % PVA-217-E aqueous solution, 4 g of 10 wt % ISOBAM aqueous solution and 81 g of water, 30 g HINOKI powder used in Example 3 is added, and then the foam-sheet is obtained by the same operation as Example 3. Amount of PVA above is 13.3% to HINOKI powder. The added PVA migrates remarkably to surface and comes to make a thin film on the surface, therefore the inside of product is not yet dry. Desirable foam-structure of sheet is not obtained for excess amount of addition of PVA.

The cohesion energy density of high polymer in adhesive latex or emulsion used in Example 1,2,3 and Comparison 1,2 are 50 to 150 cal/cc. respectively.

As the lignocellulosic light weight molding that this invention relates is composed of specified components above, the lignocellulose itself that is obtained from dust in processing of wood and scrap of woody products is available without separation of only fibrous cellulose.

As the result almost all lignocellulose more than half of that is scraped so far is used, and the obtained products of light weight foams have superior properties to usual ones. They, consequently, are utilized cheaply as heat insulators, shock absorbers, sound absorbers, absorbents, filters, compound laminated materials with others and so on in the wide range of various industrial fields. Moreover, their components are nonpoisonous organic and inorganic matters, and therefore they are used effectively as molding products and then apply to fuel, compost and so on as recycling resources. Of course, they can be used again and again, torn in pieces, after effective uses.

We claim:

1. Light weight lignocellulosic molding product having apparent density 0.6 g/cm$^3$ or less comprising four components, which are
   (1) lignocellulose,
   (2) water soluble polymer containing not less than two OH groups in a molecule and having the film properties of tensile strength 10 to 300 MPa and surface tension 30 to 65 mN/m in 0.4 wt % aqueous solution at 20° C.,
   (3) water soluble polymer containing not less than two carboxyl groups in a molecule and/or anionic surfactant, and
   (4) polymer laving the film properties of tensile strength 0.1 to 10 MPa and ultimate elongation 200 to 2000%, second transition point 30° to −40° C. and cohesion energy density 30 to 200 cal/cc.

2. Light weight lignocellulosic molding product having apparent density 0.6% g/cm$^3$ or less four components, which are
   (1) lignocellulose,
   (2) 0.5 to 1.0 wt parts of water soluble polymer containing not less than two OH groups in a molecule and having the film properties of tensile strength 10 to 300 MPa and surface tension 30 to 65 mN/m in 0.4 wt % aqueous solution at 20° C.,
   (3) 1 to 20 wt parts of water soluble polymer containing not less than two carboxyl groups and/or anionic surfactant
   (4) 5 to 150 wt parts of polymer having the film properties of tensile strength 0.1 to 10 MPa and ultimate elongation 200 to 2000%, second transition point −40° to 30° C. and cohesion energy density 30 to 200 cal/cc.

* * * * *